A. F. HINES, OF WASHINGTON, DISTRICT OF COLUMBIA.

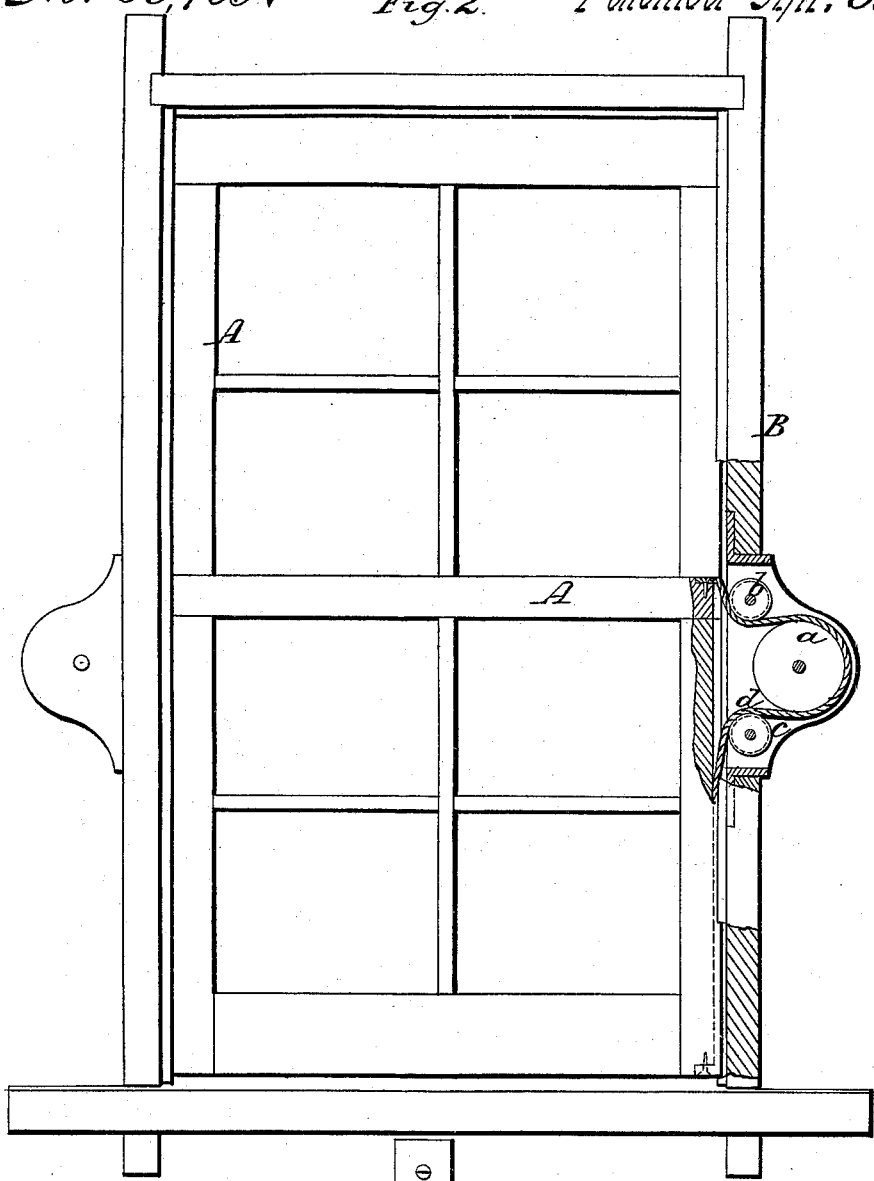

Letters Patent No. 88,763, dated April 6, 1869.

IMPROVEMENT IN SASH-PULLEY.

The Schedule referred to in these Letters Patent and making part of the same.

To all whom it may concern:

Be it known that I, A. F. HINES, of Washington, District of Columbia, have invented an Improved Cord and Pulley Arrangement for Hoisting and Lowering Sash, and for any other similar purposes; and I do hereby declare the following is a full and exact description thereof, reference being had to the accompanying drawings, making a part of this specification, and to the letters of reference marked thereon.

To enable others skilled in the art to make and use my invention, I will proceed to describe its construction and operation.

My cord and pulley arrangement is made by placing a pulley, $a$, in the rear end of a suitable box, with two friction-pulleys, $b\cdot c$, in front, the said friction-pulleys working between the sides of the box, the edges of said friction-pulleys working in a slot in the front of said box, as shown by Figure I, and a cord, $d$, passed about the pulleys.

This pulley-arrangement is then fastened into the window-frame B, at or near the meeting-rail of the sash, A, one end of the cord being attached to the meeting-rail of the sash, and the other end of the cord fastened to the bottom or top rail of sash, as the case may be, as shown by Figure II.

When thus arranged, the friction will be sufficient to keep the sash at any desired height without the use of weights, catches, springs, or any other device.

I do not claim the double-grooved pulleys combined with the single pulley, and having the cord applied to them and to the window-frame, as this has been done before; but What I do claim as my invention, and desire to secure by Letters Patent, is—

The combination of the single-grooved pulleys $a\ b\ c$, applied to the window-frame, and having the cord applied upon them, and attached to the window-sash, substantially in the manner shown and described.

A. F. HINES.

Witnesses:
THOMAS P. PARKER,
J. B. HINES.